United States Patent [19]

Schur

[11] Patent Number: 5,061,508

[45] Date of Patent: * Oct. 29, 1991

[54] FORTIFIED AND FLAVORED GLUTEN-BASED FOOD PRODUCT

[76] Inventor: Sylvia Schur, 171 Sutton Manor, New Rochelle, N.Y. 10805

[ * ] Notice: The portion of the term of this patent subsequent to Aug. 21, 2007 has been disclaimed.

[21] Appl. No.: 566,252

[22] Filed: Aug. 13, 1990

Related U.S. Application Data

[63] Continuation-in-part of Ser. No. 344,807, Apr. 28, 1989, Pat. No. 4,950,496.

[51] Int. Cl.⁵ ............................................. A23J 1/12
[52] U.S. Cl. .................................. 426/656; 426/523; 426/549; 426/518; 426/503
[58] Field of Search ............... 426/656, 497, 503, 504, 426/518, 523, 549

[56] References Cited

U.S. PATENT DOCUMENTS 3,463,770   8/1969   Fellers .................................. 426/656
3,878,305   4/1975   Damico et al. ..................... 426/656
4,950,496   8/1990   Schur .................................. 426/656

FOREIGN PATENT DOCUMENTS 0028234   2/1983   Japan .................................. 426/656

Primary Examiner—Marianne Cintins
Attorney, Agent, or Firm—Michael Ebert

[57] ABSTRACT

A gluten-based food product derived from wheat, fortified with L-lysine and flavored to provide a food that is not only a complete protein source high in fiber and low in fat and cholesterol, but one which is exceptionally palatable. To make this product, a protein-rich mass of gluten is extracted from wheat flour. Kneaded, cut, punched or otherwise introduced into the mass is L-lysine powder in an amount sufficient to form in combination with the gluten a complete protein. The l-lysine is intermixed with a seasoning powder which acts as a carrier to distribute the L-lysine throughout the mass and thereby provide a fortified and flavored mass which is then divided into food units.

11 Claims, 1 Drawing Sheet

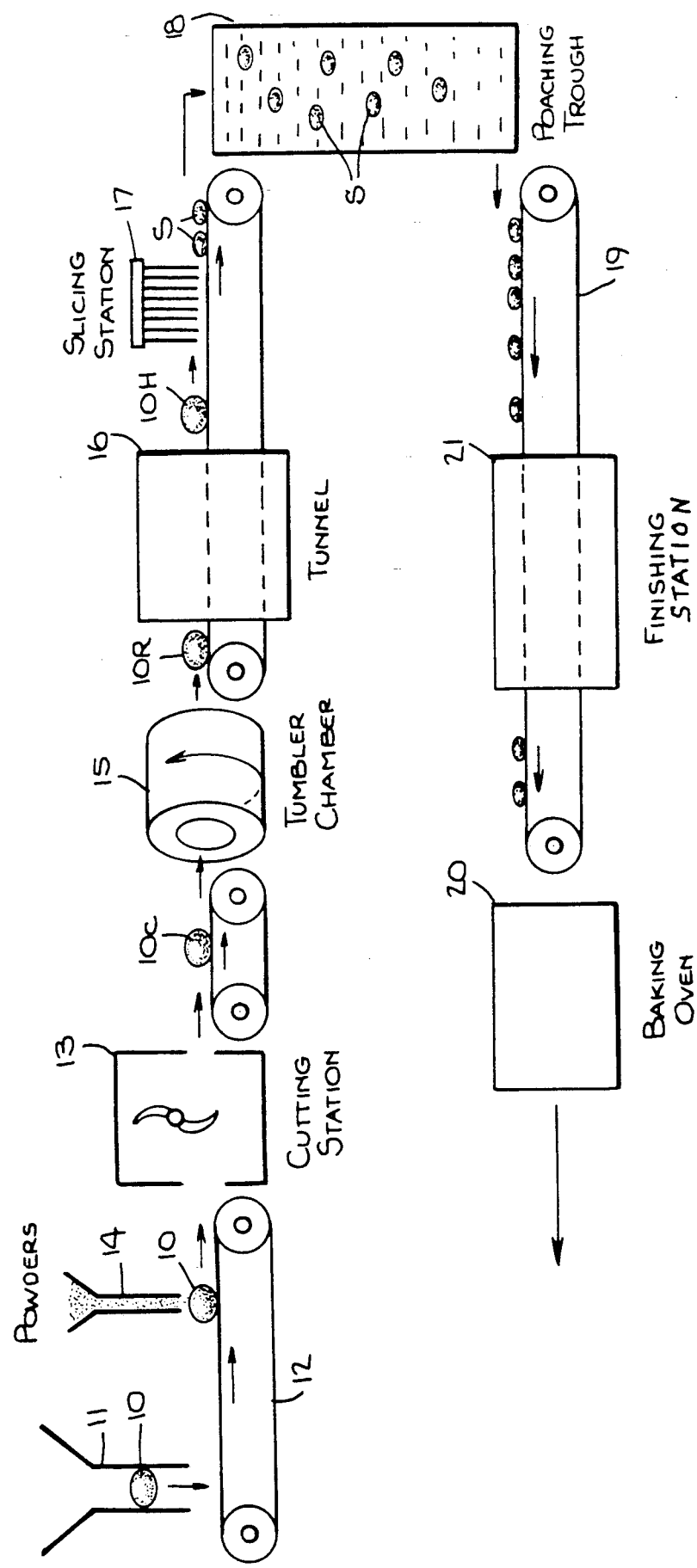

FORTIFIED AND FLAVORED GLUTEN-BASED FOOD PRODUCT

RELATED APPLICATION

This application is a continuation-in-part of my copending application Ser. No. 344,807, having the same titled, filed Apr. 28, 1989.

BACKGROUND OF INVENTION

1. Field of Invention

This invention relates generally to gluten-based food products and to techniques and apparatus for making these products, and more particularly to a wheat gluten food product fortified by L-lysine and seasoned to render the product exceptionally palatable.

2. Status of Prior Art

Because of the ever increasing consumption of fabricated and so-called "junk" foods that are notoriously deficient in nutritional value, there has been a concomitant growth in the demand for vegetable proteins having desirable nutritional properties. Wheat gluten, the protein fraction in wheat flour, possesses a high protein content as well as unique structural and adhesive properties. In its freshly extracted wet state it is known as gum gluten, and when thereafter dried it becomes a free-flowing powder of high protein content and bland taste. It is generally used in food processing in that form.

Wheat gluten is now widely used to fortify breakfast cereals and it is also valuable to bakers, for it acts to strengthen dough, to retain gas and to control expansion, these characteristics resulting in uniformly-shaped baked products. And because gluten absorbs about twice its weight in water, its capacity for holding water gives rise to an increased yield and extended shelf life in many food systems. The useful properties of gluten and its many advantages are set forth in greater detail in the booklet "Wheat Gluten—A Natural Protein for the Future—Today" published in 1981 by the International Wheat Gluten Association—Shawnee, Kans.

The basic procedure for manufacturing a gluten powder involves mixing flour with a dough-producing solution to produce a paste which is developed to form dough, the dough then being washed to remove as much of the starch and other soluble components as possible.

Various techniques are known to separate gluten from starch. Perhaps the oldest is the "Martin process" in which the dough, after hydration, is rolled between fluted rolls and kneaded in a trough with reciprocating rolls under water at high pressure. This action washes away the starch and leaves a mass of gluten.

In the "batter process" developed by the U.S. Department of Agriculture, a soft coherent mass of dough is mechanically broken up in the presence of additional water to yield suspended curds of gluten with the starch removed. The curds are recovered on a gyrating screen through which the starch milk passes. The "Fesca" on direct centrifugation process results in a well dispersed slurry of flour with gluten development. The starch can be removed from suspension by centrifugation while the protein remains suspended.

The more recent "Alfa-Laval" gluten extraction process is regarded in an article appearing in the publication "Milling and Baking News" of July 4, 1978 as offering advantages over earlier extraction techniques. This process converts whole wheat into a coarse flour which is mixed with water to form a thick batter. The batter is then homogenized in a disc type unit which discharges a slurry of starch, protein and other flour components. This step is followed by centrifugation which fractionates the flour into prime starch, B-starch, vital gluten and dried solubles. The 1984 patent to Guibert, U.S. Pat. No. 4,473,299, discloses a system for producing gluten continuously at a rapid rate.

It is important that the distinctions between protein extracted from grain and that incorporated in animal meat be clearly understood.

Proteins are generally classified as complete, partially complete and totally incomplete, depending on their ability to maintain life and promote growth. A complete protein contains the essential amino acids in sufficient quantities for maintenance and normal rate of growth. These proteins have a high biologic value. Animal proteins such as meat, milk and eggs are all complete proteins, though not necessarily identical in protein quality or biologic value. However, the complete proteins in animal-based foods often carry an excess baggage of fats, particularly saturated fats which are high sources of cholesterol. Moreover, they are lacking in dietary fiber.

Partially complete proteins will maintain life, but they lack sufficient amounts of some of the amino acids necessary for growth. Gliadine, found in wheat gluten, falls in this class. Adults can maintain satisfactory nutrition for indefinite periods when consuming sufficient amounts of protein from certain cereals and legumes. Totally incomplete proteins are incapable of replacing or building new tissue and, therefore, cannot support life or promote growth. The protein found in gelatin is an example of totally incomplete protein.

Certain plant foods and grains are limited in their animo acid L-lysine content (alpha, epsilon—diaminocaproic acid). When grain protein sources are supplemented by the amino acid in which they are deficient, or the food is eaten with a small amount of an animal protein source, a complete protein is then provided.

Amino acids are nitrogen-containing building blocks of proteins. The quality of a protein depends on the kinds and amounts of amino acids present in the foods in relation to body needs. Amino acids may be classified as essential and nonessential. All amino acids are necessary for the synthesis of the protein molecule. However, the body cannot produce certain amino acids; these must be supplied by food. The human adult requires eight essential amino acids; and growing children require nine or ten.

The essential amino acids include: isoleucine, leucine, L-lysine, methionine, phenylalanine, threonine, tryptophan and valine. Histidine is also essential for children. Arginine is classified as semi-essential since growth is retarded if it is not available. The presence of cystine and tyrosine in the diet will reduce the requirement for methionine and phenylalanine, respectively, and are, therefore, also semi-essential. Semi-essential amino acids include: arginine, cystine and tyrosine; nonessential amino acids include alanine, aspartic acid, glutamic acid, glycine, hydroxyproline, norleucine, proline and serine.

The properties of a protein molecule are a reflection of the combined properties of its amino acids, for these string together to form a protein's primary structure.

Vegetable and grain sources of protein lack one or more of the essential amino acids and are therefore incomplete. However, when eaten together with a complete protein complement, as for example, milk with cereal, or cheese or meat in a pasta dish, the protein in the grain is utilized as a complete protein. Complementary incomplete proteins such as rice and beans or wheat and soy also function as complete proteins. The addition of L-lysine to the wheat protein completes its amino acid profile, in a total equal to such sources as poultry, red meat or eggs. Without the addition of other foods, wheat protein also helps provide better dietary balance, in a low-fat, high-fiber composition.

Gluten as a food source is of interest in developing nations as a low-cost protein alternative to meat. In the United States, gluten-based food products follow the government's Dietary Guidelines to reduce fat and cholesterol and increase fiber and complex carbohydrates in the diet. Products currently on the market include soy, or wheat gluten meat analogs sold in health food stores. But these are not generally fortified as complete protein sources, for they lack L-lysine. Nor are they flavored for taste appeal.

In terms of American food needs, national health policies recommend changing American diet patterns to reduce fats, especially saturated fats largely derived from animal protein sources, and to increase fiber. Fiber is absent in animal proteins but well represented in wheat.

Of prior art interest are the U.S. patents to Feller, U.S. Pat. No. 3,463,770 and Damico, U.S. Pat. No. 3,878,305, and the Japanese patent 0028234.

SUMMARY OF INVENTION

In view of the foregoing, the main object of this invention is to provide a gluten-based food product that satisfies existing government dietary guidelines, and to techniques and apparatus for rapidly and efficiently producing this product.

More particularly, an object of this invention is to provide a food product of the above type which includes a complete protein and has a flavor profile that renders the product exceptionally palatable so that the food product is self-sufficient and need not be supplemented.

A significant advantage of the invention is that it is extracted from wheat with bran and is therefore low in fat and cholesterol, yet high in fiber, the product being fortified with L-lysine hydrochloride to afford a protein that is higher in quality than that of wheat alone.

Also an object of this invention is to provide a production line for producing a gluten-based food product on a large scale.

Briefly stated, these objects are attained in a gluten-based food product derived from wheat with bran, fortified with L-lysine and flavored to provide a food that is not only a complete protein source high in fiber and low in fat and cholesterol, but one which is exceptionally palatable.

To make this product, a protein-rich mass of gluten is extracted from wheat flour. Kneaded, cut, punched or otherwise introduced into the mass is L-lysine powder in an amount sufficient to form in combination with the gluten a complete protein. The L-lysine powder is intermixed with a seasoning powder which acts as a carrier to distribute the L-lysine throughout the mass and thereby provide a fortified and flavored mass which is then divided into food units.

BRIEF DESCRIPTION OF DRAWING

For a better understanding of the invention as well as other objects and features thereof, reference is made to the annexed drawing whose single FIGURE schematically illustrates a preferred production line for producing fortified and flavored gluten-based food products in accordance with the invention.

DESCRIPTION OF INVENTION

The present invention is directed to a wheat-gluten food product serving as a low-cost protein alternative as a food source to animal-derived meats. This gluten-based food product is fortified to provide a complete protein comparable to that contained in animal meat. The economic advantages gained by the invention can best be understood by comparing the amount of grain required to feed animals to produce meat with the amount of grain required to produce a gluten-based food product having an equivalent amount of protein.

It is estimated that to generate a single pound of beef in grain-fed cattle, it takes 16 pounds of feed grain. This represents a 12% yield. And it is also estimated that with grain-fed chicken, it takes about 3 pounds of feed per one pound of chicken, this representing a 30% yield. The invention produces a fortified wheat protein which is complete in essential amino acids at a 50% yield, with a total protein equivalent to chicken meat.

We shall now describe the steps involved in producing the food product.

Step I

Gluten Production

In producing a gluten-based food product in accordance with the invention, the first step is to extract a protein-rich mass of gluten from wheat flour. The present invention is not limited to any particular technique for this purpose, such as the techniques disclosed in the background section. A simple and effective extraction procedure is the following:

Water is added to wheat flour to form a dough from which water-soluble starches are then removed. To this end, the dough is soaked in water and vinegar (acetic acid) for about one hour. During the soaking period, the proteins in the flour hydrate and the starches gelatinize.

The vinegar in the water facilitates coagulation of the proteins, making them less likely to be washed away with the starch during subsequent washings. After the soaking period, the water containing the dissolved starch is drained away from the dough mass, and the dough mass is then rinsed continuously with water until the rinse water is clear, thereby indicating an absence of starch and leaving a mass of protein/gluten.

In this example, the relative proportions of the ingredients which total 100% are preferably as follows:

(a) a combination of flours including whole wheat flour of the type that is commercially available from major millers and containing approximately 13% protein (28.72%).

(2) water as a soaking medium (70.90%).

(3) Vinegar (0.38%).

The finished gluten mass represents a 50% yield based on wheat flour by weight. The percentages given above represent preferred values, but in practice other relative percentages may be used.

Step II

Enrichment

In order to enrich the gluten mass yielded by step I and at the same time render it more palatable, kneaded into this mass is an enrichment and flavoring composition constituted by L-lysine and a seasoning mixture.

The L-lysine is preferably in the form of a pure dry powder derived from L-lysine hydrochloride, from powdered egg white or from an appropriate dairy product that is a controlled source of L-lysine.

The seasoning mixture includes but is not limited to onion powder, cloves, caraway, black pepper, and chili pepper. The mixture is designed to afford a hearty and satisfying flavor profile as well as to impart an appealing color, which in practice may be brownish, to the food product.

As the enrichment and flavoring composition is kneaded into the gluten dough mass, the seasoning mixture component acts as a carrier for the L-lysine powder component, and in doing so helps distribute the L-lysine more uniformly throughout the dough mass and to hold it in place.

In practice, kneading must be carried out quickly for uniform distribution of the seasoning and L-lysine components without stretching the dough to a point resulting in the loss of elasticity or toughness.

Step II results in a fortified and flavored wheat gluten meat. In this step, the relative portions of the ingredients which total 100% are preferably as follows:

(1) Gluten, prepared wet as in step I (96%).

(2) L-lysine hydrochloride, such as L-lysine HCL manufactured by the Ajinomoto Company, Inc., which meets USP/FCC requirements (2.80%).

(3) Seasoning blend (1.20%).

The percentages given above represent preferred values, but in practice other relative percentages are usable.

Step III

Setting

The enriched and flavored gluten mass produced by Step II is then divided into separate units having a desired configuration, such as a ball, a cube or any other shape. Thus a ball shape is appropriate for a gluten-based food product to be marketed as a substitute for meat balls derived from animal meat.

The units so produced are then steamed in a tunnel or vessel or oven or synthetic plastic film material to coagulate and set the gluten mass.

The resultant fortified wheat protein food product is complete in essential amino acids to provide a total protein equivalent to chicken meat, and with a texture and flavor that is highly palatable and suitable for appealing dishes. Laboratory analysis has verified that lysine added in accordance with the invention in the manner above described is retained throughout the process.

While there has been described a preferred embodiment of fortified and flavored gluten-based self-sufficient food product in accordance with the invention, it will be appreciated that many changes and modifications may be made therein without, however, departing from the essential spirit thereof. Thus the flavoring may be such as to impart a meat-like, a fish-like or a nut-like taste to the food product; for in the absence of flavoring the reinforced protein has a bland, non-distinctive flavor.

Preferred Techniques and Apparatus

In a technique for producing a fortified and flavored gluten mass in accordance with the invention which is a complete protein, the seasoning powder serves a dual function, for it not only flavors the resultant food product to render it more palatable, but it also acts to effect a substantially uniform distribution of the L-lysine throughout the gluten mass. This feature is important, since the mass is later divided into individual food units, and in the absence of proper distribution of the L-lysine, some of the units may lack sufficient L-lysine to form a complete protein, while others may have excessive L-lysine.

To carry out this technique on a mass production basis, we have found that this can best be done using a vertical cutter/mixer unit to rapidly disperse the L-lysine and seasoning powders throughout the gluten mass. Such units are commercially available and are commonly used in pizza dough preparation or in sausage making. One such unit which we found served our purpose includes motor-driven cutting blades operating in a range of 1725 to 3000 RPM.

Using a unit of this type, the gluten mass is placed in a mixing bowl, and a mixture of L-lysine and seasoning powders in proper proportions is added to the mass through s suitable hopper. The rotating cutter blades then act repeatedly to chop the mass and in doing so to distribute the powders throughout the mass, the seasoning powders acting as a carrier for the L-lysine powders. This action is carried out for a period, such as a minute or more, sufficient to effect a substantially uniform distribution of the powders, after which the comminuted mass is reformed, as by tumbling. Alternatively, instead of rotating cutter blades, use may be made of a bank of reciprocating pins which function to punch the L-lysine/seasoning powder mixture into a gluten mass.

In practice, the kneading, cutting or punching action must be carried out quickly for uniform distribution of the powders without stretching the gluten mass to a point resulting in the loss of elasticity or toughness.

To carry out this operation on a large scale for high production purposes, use may be made of a production line, as shown in the drawing, in which a gluten mass 10 to be processed, extracted from wheat flour, is deposited through a chute 11 onto a moving conveyor belt 12. Conveyor 12 transports gluten mass 10 toward the rotating blades of a cutter station 13. Before mass 10 enters this station, a charge of L-lysine intermixed with seasoning powder in proper proportions is added to the mass through a hopper 14. In station 13, the rotating blades, in repeatedly cutting through the gluten mass, act to force the mixture into the interior of the mass and to distribute the powder mixture throughout the mass.

Emerging from station 13 is a comminuted gluten mass 10C having the powders dispersed therein, this comminuted mass being conveyed to a tumbling chamber 15. In practice, the tumbling chamber, which functions to tumble the comminuted gluten mass to reform it, may be a vacuum chamber. The reformed gluten mass 10R discharged from tumbling chamber 15 is then conveyed through a blast-chill tunnel 16 whose function is to chill and thereby harden the gluten mass to facilitate subsequent slicing into individual units which may thereafter be shaped or further processed. Or the gluten mass may be fully frozen in tunnel 16 and taken out of the tunnel and then stored for later use or sold.

In a continuous line process, the hardened gluten mass 10H emerging from tunnel 16 is fed into a slicing station 17 to produce gluten slices S which are fed into a poaching trough 18 where it is subjected to water heated to a poaching temperature of about 212° F. which acts to coagulate the gluten slices. From poaching trough 18 the slices are deposited onto a draining conveyor belt 19 which permits the water to drain while feeding the slices into an oven 20. In this oven, the slices are baked at a temperature of about 400! F. for about 10 minutes.

As an option, prior to entering the oven the slices may pass through a finishing station 21 for final reshaping or further seasoning.

Since wheat gluten is also available in dry white powder form, this gluten powder to which bran may be added may be intermixed with a mixture of L-lysine and seasoning powders in proper proportions and water then added thereto to provide a fortified and flavored gluten mass which may be processed in the production line.

I claim:

1. A gluten-based self-sufficient food product consisting essentially of a gluten mass extracted from grain into which is introduced L-lysine powder intermixed with a powdered seasoning agent which acts as a carrier to distribute the L-lysine powder substantially uniform throughout the mass to provide a fortified and flavored mass which is dividable into units, the relative amount of L-lysine being sufficient to form in combination with the gluten a complete protein.

2. A food product, as set forth in claim 1, in which the units are coagulated.

3. A food product as set forth in claim 1, in which the units are baked.

4. A method of producing a platable, gluten-based food product comprising the steps of:
   extracting a protein-rich gluten mass from wheat flour dough; and
   (b) working into the gluten mass a mixture of L-lysine and seasoning powders, the seasoning powders acting as a carrier for the L-lysine powders to effect substantially uniform distribution thereof through the mass to provide a fortified and flavored mass, the L-lysine being in an amount relative to the gluten to produce a complete protein.

5. The method as set forth in claim 4, wherein said working is effected by rotating cutter blades to produce a communited mass which is then reformed.

6. The method as set forth in claim 5, wherein the mass is reformed by tumbling.

7. The method as set forth in claim 6, wherein said reformed mass is chilled to effect hardening thereof, the hardened mass then being sliced to provide individual slices.

8. A method as set forth in claim 7, wherein said chilling is effected by passing the mass through a blast tunnel.

9. The method as set forth in claim 7, wherein said slices are then fed through a poaching trough in which the slices are subjected to water heated to a poaching temperature.

10. The method as set forth in claim 9, wherein said poached slides from the trough are deposited onto a draining belt to drain the water therefrom.

11. The method as set forth in claim 9, wherein said draining belt conveys the poached slides into a baking oven.

* * * * *